Inventors:
Sidney V. Hettinger
and Robert W. Wayman

Dec. 6, 1955   S. V. HETTINGER, JR., ET AL   2,725,762
TRANSMISSION
Filed April 14, 1951   2 Sheets-Sheet 2
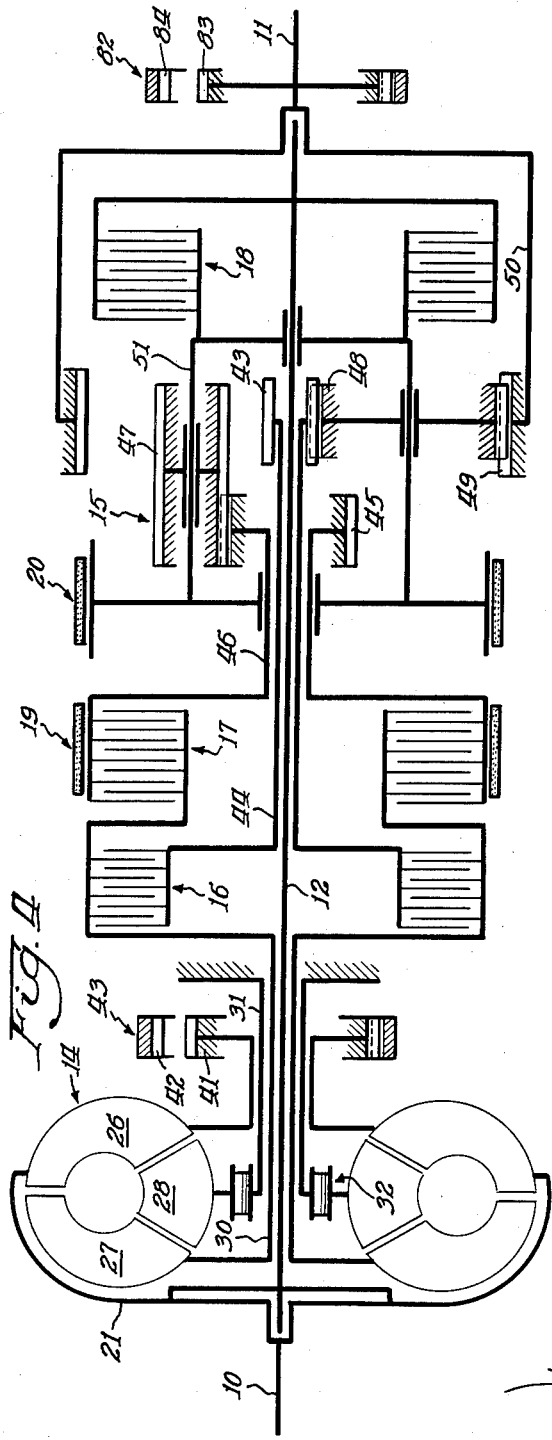
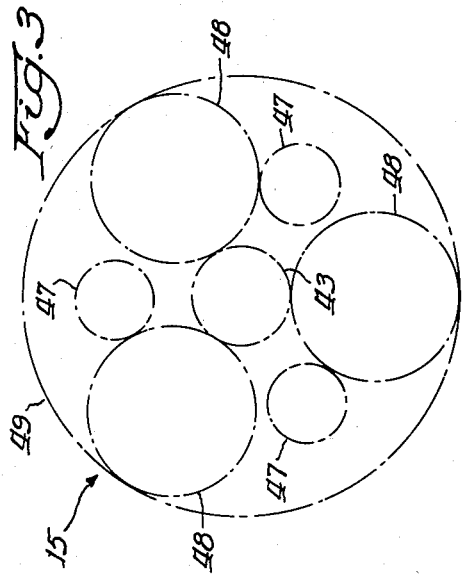
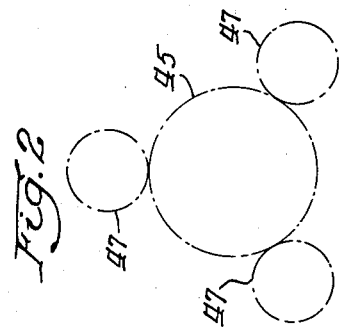
Inventors:
Sidney V. Hettinger
and Robert W. Wayman

United States Patent Office 2,725,762
Patented Dec. 6, 1955

2,725,762

TRANSMISSION

Sidney V. Hettinger, Jr., and Robert W. Wayman, Muncie, Ind., assignors to Borg-Warner Corporation, Chicago, Ill., a corporation of Illinois Application April 14, 1951, Serial No. 221,062

24 Claims. (Cl. 74—688)

The present invention relates to automotive vehicle transmission and more particularly relates to a truck transmission employing a hydrodynamic coupling device and a planetary gear set connected in series in order to provide a plurality of forward speed power trains and a reverse power train between the engine and the driving wheels of the vehicle.

The principal object of the present invention is to provide a transmission for an automotive vehicle employing a conventional hydraulic torque converter in which the low forward and reverse drives through the transmission proceed through the hydraulic torque converter and in which the hydraulic torque converter is locked to rotate as a unit during operation of the transmission in the high forward speed drives therethrough.

Another object of the invention is to provide a transmission for an automotive vehicle employing a hydraulic torque converter, three friction clutches and two friction brakes in association with a planetary gear set which is capable of providing four forward and one reverse drive ratios, including a direct one-to-one drive through the transmission or, alternatively, a split one-to-one drive therethrough. In connection with this object it will be apparent that the present invention provides a sufficient number of driving ratios to render the transmission particularly suitable for use in trucks and does this with a minimum of controlling clutches and brakes. Further the alternative one-to-one driving ratio is obtained without providing any additional control clutches or brakes.

In the transmission disclosed herein the hydraulic torque converter provides smooth operation and the feature of locking up the torque converter so that it rotates as a unit during the high forward speed power trains affords the necessary economy of operation. Specifically, the hydraulic torque converter and the planetary gear set both convert torque during the first and second forward speed drives and during the single reverse drive. The hydraulic torque converter is locked up during forward speed drives above second and the planetary gear set, alone, converts torque during third. In the normal high speed drive both the hydraulic torque converter and the planetary gear set are locked up so that the entire transmission assembly rotates as a unit with no reduction therethrough. In the alternative high speed drive the planetary gear carrier in the planetary gear set is driven directly by the engine drive shaft while a sun gear of the planetary gear set is driven through the hydraulic torque converter.

All of the clutches and brakes employed by the present transmission may be of the friction type and each may be controlled by means of fluid pressure and this also contributes greatly to the smoothness of operation of the transmisson.

The above and numerous other objects and advantages of the present invention will become apparent from the following detailed description, when read in conjunction with the accompanying drawings, wherein:

Fig. 2 is a sectional view of the planetary gear set taken substantially along the lines 2—2 and looking in the direction of the arrows;

Fig. 3 is a sectional view of the planetary gear set taken substantially along the line 3—3 and looking in the direction of the arrows; and Fig. 4 is a schematic illustration of the transmission.

Figure 1:
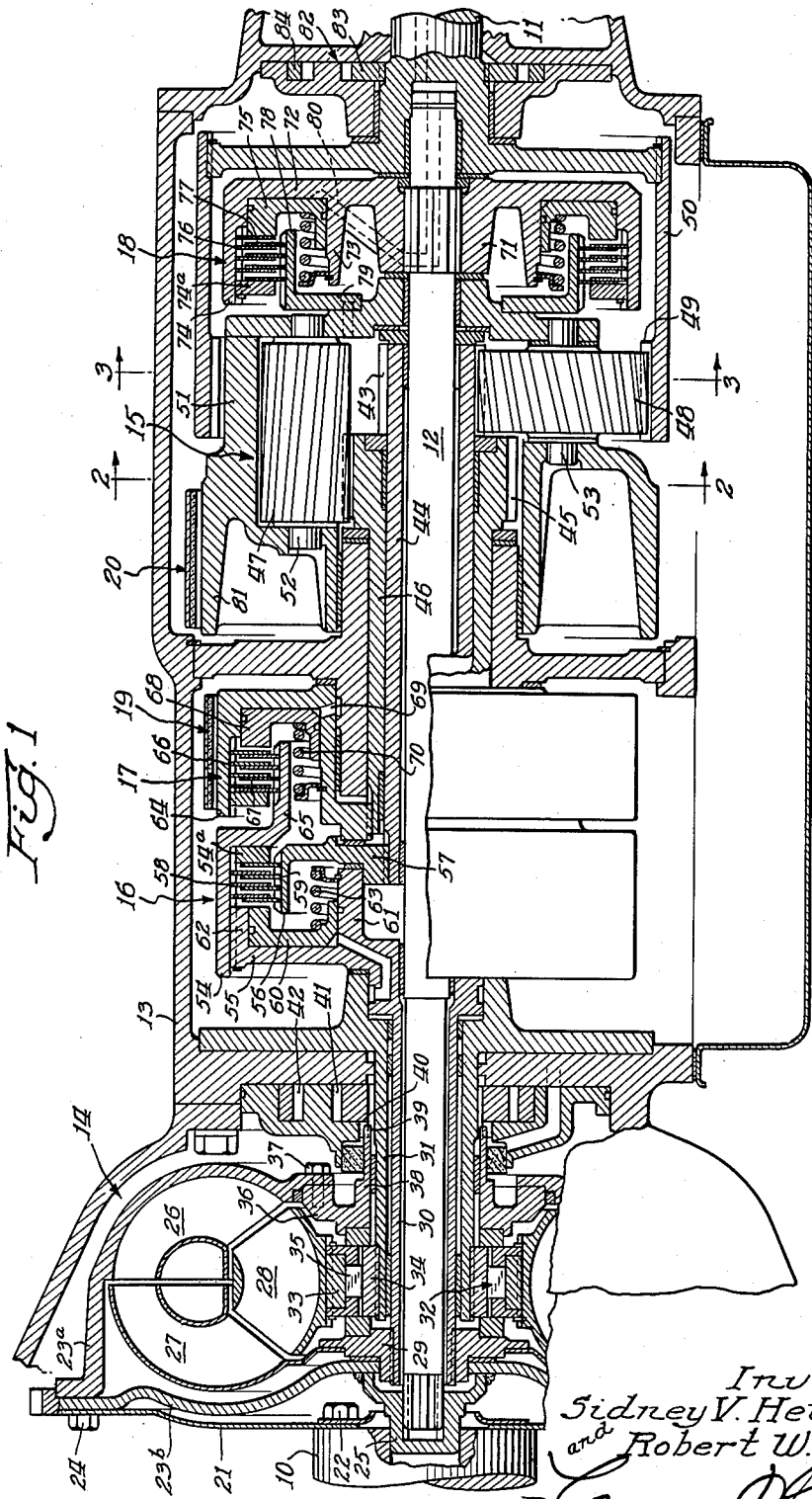
Fig. 1 is a detailed sectional view of the transmission.

Referring to the drawings, wherein like reference numerals in the different views designate identical parts, the transmission comprises a drive shaft 10, a driven shaft 11, and an intermediate shaft 12, which is at all times driven directly by the drive shaft 10. The shafts 11 and 12 are suitably mounted within the transmission housing 13 and this housing also encloses a hydraulic torque converter 14 and a planetary gear set 15. The transmission includes three friction clutches 16, 17 and 18 and two friction brakes 19 and 20.

The drive shaft 10 has a disc 21 bolted thereto by means of bolts 22 and the disc 21 is also bolted to both sections 23a and 23b of the housing of the torque converter 14 by means of bolts 24. The converter housing section 23b is welded to a collar 25 that is piloted within the drive shaft 10. The converter housing section 23a is formed integrally with the impeller 26 of the torque converter 14. The hydraulic torque converter 14 also includes a turbine element 27 and a stator element 28, the turbine element 27 being secured to a collar 29 which has internal splines that mate with corresponding external splines formed on a sleeve shaft 30 concentrically and rotatably mounted around the intermediate shaft 12. The stator element 28 is connected to a stationary sleeve shaft 31 by means of a one-way brake 32. The one-way brake 32 comprises an external race 33, suitably splined to the stator element 28, an internal race 34 splined to the sleeve shaft 31 and a plurality of sprags or rollers 35. The one-way brake 32 functions to prevent the stator element 28 from rotating reversely but permits it to rotate forwardly, that is, in the direction of rotation of the drive shaft 10. The torque converter 14 is filled with fluid and when the impeller element 26 rotates, the turbine 27 initially rotates at a speed slower than that of the impeller 26. During this phase of operation of the torque converter 14 the stator element 28 tends to rotate reversely but is prevented from so doing because of the one-way brake 32. As the speed of the turbine element 27 approximates the speed of the impeller 26 the torque converter 14 functions as a fluid coupling and under these conditions the stator 28 no longer tends to rotate reversely but instead rotates forwardly at the same speed as the impeller and turbine 27. Hydraulic torque converters of this type are quite well known and therefore no further description thereof is deemed necessary.

The section 23a of the torque converter housing is bolted to a flange 36 by means of bolts 37, the flange being formed on a sleeve 38. The sleeve 38 is freely rotatable about the stationary sleeve shaft 31 and has a set of teeth 39 which mesh with corresponding teeth 40 formed on one side of a gear 41. The gear 41 meshes with a gear 42 and these two gears 41 and 42 together comprise a front fluid pump. It is apparent the pump operates whenever the drive shaft 10 rotates.

The planetary gear set 15 comprises a sun gear 43 integrally formed on a sleeve shaft 44, concentrically mounted and rotatable about the intermediate shaft 12, a second sun gear 45 integrally formed on a sleeve shaft 46 which is freely rotatable about the sleeve shaft 44, a group of planetary pinions 47 which mesh with the sun gear 45, and a group of planetary pinions 48 which mesh with the sun gear 43, with the pinions 47 and with a ring gear 49 formed integrally with a cylindrical drum 50. A planetary gear carrier 51 is rotatable about the shaft 12 and has two groups of planetary shafts 52 and 53 for rotatably mounting the pinions 47 and 48.

The friction clutch 16, when engaged, connects the sleeve shaft 30 and the sleeve shaft 44, and comprises a cylindrical member 54, splined to a flange 55 integrally formed on the sleeve shaft 30, and a cylindrical member 56 which has a flange 57 splined to the shaft 44. A plurality of friction discs 58 are splined to the cylinder 54 but are slidable longitudinally with reference thereto. The cylinder 56 has a plurality of discs 59 splined thereto and a piston 60, when moved to the right, compresses the discs 58 and 59 between itself and an abutment 54a secured to the cylindrical member to cause engagement of the clutch 16. The piston 60 is reciprocable between two flanges 61 and 62 axially extending from the flange 55, and as is apparent from Fig. 1, when fluid under pressure is admitted behind the piston 60 the clutch 16 is engaged. A compression spring 63 continually biases the piston 60 to the left in order to cause disengagement of the clutch 16.

The clutch 17 is provided for connecting the sleeve shaft 30 to the sleeve shaft 46 and sun gear 45. This clutch includes a cylindrical element 64 splined to the sleeve shaft 46 and a cylindrical extension 65 on the drum 54. A plurality of discs 66 are splined to the cylindrical element 64 and a plurality of discs 67 are splined to the cylindrical extension 65. A piston 68 is reciprocable within the cylindrical element 64 and when fluid is admitted under pressure through a conduit 69 the piston 68 is forced to the left to cause engagement of the discs 66 and 67 and consequent engagement of the clutch 17. A compression spring 70 is provided for continuously urging the piston 68 to the right to cause disengagement of the clutch 17.

The clutch 18 is provided for directly connecting the planetary gear carrier 51 with the intermediate shaft 12. The clutch 18 includes a sleeve member 71 splined to the shaft 12, the sleeve member 71 having a radially extending flange 72 to which are secured a pair of axially extending flanges 73 and 74. The flanges 72, 73 and 74 together comprise a cylinder element within which a piston 75 is reciprocable. A plurality of discs 76 splined to the flange 74 are alternatively spaced between a plurality of discs 77 splined to a cylindrical element 78 having a flange 79 secured to the planetary gear carrier 51. When fluid under pressure is admitted through the conduit 80 behind the piston 75 the discs 76 and 77 are compressed together between the piston 75 and an abutment 74a secured to the flange 74, to cause engagement of the clutch 18.

The brake 19 consists of a brake band mounted around the periphery of the cylindrical element 64 and upon the application of fluid under pressure to a fluid motor (not shown) the brake band is applied and caused to engage the cylinder 64 to brake rotation thereof. The brake 20 likewise comprises a brake band which is fluid pressure actuated by means of a fluid motor (not shown) and when this fluid motor is operated the brake band is brought into engagement with a cylindrical element 81 formed on the carrier 51 to thereby brake rotation of the carrier 51.

The present transmission also includes a rear fluid pump 82, that consists of a gear 83 which rotates with the driven shaft 11 and meshes with a gear 84.

The operation of the present transmission is as follows. When the transmission is conditioned for neutral all of the clutches 16, 17 and 18, and the brakes 19 and 20 are disengaged. Under this condition the drive shaft 10 directly drives the impeller 26 of the hydraulic torque converter and also directly drives the intermediate shaft 12. The torque transmitted through the intermediate shaft 12 is dissipated under this condition due to the fact that the clutch 18 is disengaged. Similarly the turbine element 27 of the hydraulic torque converter 14, and the sleeve shaft 30 merely idle due to the fact that the clutches 16 and 17 are disengaged.

The low forward speed power train is established through the transmission by engaging the clutch 16 and the brake 19 while the other clutches and brake are disengaged. Under this condition, as is true also during neutral, the intermediate shaft 12 merely idles due to the fact that the clutch 18 is disengaged. The low speed power train, however, is completed between the drive shaft 10 and the driven shaft 11 and extends from the drive shaft 10 through the impeller 26, turbine 27, sleeve shaft 30, clutch 16, sleeve shaft 44, to the sun gear 43. Assuming that the sun gear 43 is driven in a clockwise direction, the planetary pinions 48 tend to rotate counterclockwise and in turn rotate the pinions 47 in a clockwise direction. The sun gear 45, which is the reaction element during this drive ratio through the transmission is stationary and accordingly when the pinions 47 rotate clockwise the planetary gear carrier 51 is also rotated clockwise. It is therefore seen that the pinions 48 rotate counterclockwise about their own axis and also have a clockwise orbital movement. Due to the ratios of the number of teeth of the different elements on the planetary gear set 15 the orbital speed of rotation of the planetary pinions 48 is greater than the axial speed of rotation thereof and consequently the ring gear 49 and driven shaft 11 are driven clockwise at a reduced speed with respect to the drive shaft 10.

When the transmission is conditioned for second, or low intermediate forward speed drive, the clutch 17 and the brake 20 are engaged while the remaining clutches and brake are disengaged. Under this condition the intermediate shaft 12 idles, due to the fact that the clutch 18 is disengaged, and a drive is established from the drive shaft 10 to the driven shaft 11 which proceeds from the drive shaft 10 through the torque converter 14, through the shaft 30, clutch 17, and through the sleeve shaft 46 to the sun gear 45. Under this condition of operation the carrier 51 serves as the reaction element inasmuch as it is held stationary by the brake 20. Again assuming that the sun gear 45 rotates in a clockwise direction, a counterclockwise rotation is imparted to the planetary pinions 47. The planetary pinions 47 impart a clockwise rotation to the larger planetary pinions 48 and these in turn impart a clockwise rotation to the ring gear 49 and the driven shaft 11. Due to the difference in the number of teeth on the pinion 47 and on the pinion 48 this drive is also a reduced drive although the ratio is somewhat higher than the ratio of the first forward speed drive.

In third, or high intermediate forward speed drive, between the drive shaft 10 and the driven shaft 11 the clutch 18 and the brake 19 are engaged while the remaining clutches and brake are disengaged. Due to the engagement of the clutch 18 the carrier 51 is driven in a forward or clockwise direction at the same speed as the drive shaft 10. The brake 19 holds the sun gear 45 against rotation and the sun gear 45 serves as the reaction element for the planetary gear set 15 at this time. Due to the fact that the sun gear 45 is held stationary, clockwise rotation of the carrier 51 causes the planetary pinions 47 to rotate clockwise about their own axes and they in turn cause the planetary pinions 48 to rotate counterclockwise about their own axes. The speed of orbital rotation in a clockwise direction of the planetary gear carrier 51 is greater than the axial speed of rotation of the planetary pinions 48 in a counterclockwise direction and therefore the ring gear 49 and driven shaft 11 are driven in a forward direction but at a slightly reduced speed with respect to the speed of rotation of the drive shaft 10.

The present transmission provides both a direct one-to-one drive between the drive and driven shafts 10 and 11 and also a split one-to-one drive between these shafts. It is contemplated that the direct drive will be utilized primarily and under this condition of operation all three clutches 16, 17 and 18 are engaged while both brakes 19 and 20 are disengaged. Engagement of the clutch 18 causes the planetary gear carrier 51 to be driven at the same speed as the drive shaft 10. Engagement of the clutches 16 and 17 causes the sun gears 45 and 43 to be locked together. It is a well-known fact that when two elements of a planetary gear set are locked together, the entire gear set rotates as a unit and because of this fact and because the planetary gear carrier 51 is driven at the same speed of rotation and in the same direction as the drive shaft 10, the ring gear 49 and likewise the driven shaft 11 are both driven at the same speed and in the same direction as the drive shaft 10. The sun gears 45 and 43 are likewise driven at the same speed as the drive shaft 10. It is apparent therefore, that the hydraulic torque converter 14 is locked out during direct forward speed drive between the drive shaft 10 and the driven shaft 11, just as it was in the case of third forward speed drive between the drive and driven shafts 10 and 11.

In the split fourth forward speed drive the clutches 17 and 18 are engaged while the clutch 16 and the brakes 19 and 20 are disengaged. Under this condition of operation the planetary gear carrier 51 is driven in a forward direction at the same speed as the speed of rotation of the drive shaft 10 and the sun gear 45 is driven in a forward direction by means of a power train that extends from the drive shaft 10 through the hydraulic torque converter 14, through the sleeve shaft 30, through the clutch 17, and through the sleeve shaft 46 to the sun gear 45. When the vehicle speed increases sufficiently so that the hydraulic torque converter 14 is functioning as a fluid coupling, that is, when all the elements of the torque converter rotate at substantially the same speed, the sun gear 45 and the planetary gear carrier 51 are rotating in a forward direction at substantially the same speed of rotation. In effect, the planetary gear set 15 is locked up and the driven shaft 11 is driven at the same speed of rotation as the drive shaft 10. During the split fourth forward speed drive, if the load on the driven wheels of the vehicle increases sufficiently the drive ratio between the drive shaft 10 and the driven shaft 11 will drop to somewhat less than a one-to-one ratio. Under this condition there will be a slight amount of slippage in the torque converter 14 and the sun gear 45 will consequently rotate at a slightly reduced speed with respect to the planetary gear carrier 51. The planetary gear set 15 therefore will no longer, in effect, be locked up. Thus the carrier 51 will be driven clockwise at a slightly greater speed than the sun gear 45 and this will cause the planetary pinions 47 to rotate axially slowly in a clockwise direction. This axial rotation in a clockwise direction of the planetary pinions 47 causes the pinions 48 to rotate slightly counterclockwise axially and therefore the speed of rotation of the ring gear 49 and the driven shaft 11 may be somewhat less than the speed of rotation of the drive shaft 10 and the planetary gear carrier 51.

The present transmission may be conditions for reverse drive between the drive shaft 10 and the driven shaft 11 by means of engaging the clutch 16 and the brake 20 and disengaging the clutches 17 and 18 and brake 19. Under this condition the intermediate shaft 12 idles and the reverse drive power train is completed between the drive and driven shafts 10 and 11 through the hydraulic torque converter 14, through the sleeve shaft 30, through the clutch 16, and sleeve shaft 44 to the sun gear 43. Since the brake 20 is engaged at this time the planetary gear carrier 51 is held stationary and serves as the reaction element of the gear set 15. The forward rotation of the sun gear 43 imparted thereto through the hydraulic torque converter 14, causes the planetary pinions 48 to rotate reversely and they in turn impart a reverse rotation to the ring gear 49 and driven shaft 11.

From the above description of the present invention it is apparent that we have provided a transmission that is particularly suitable for trucks and which provides smoothness and economy of operation. It is contemplated that numerous changes and modifications may be made in the present invention without departing from the spirit or scope thereof.

What is claimed is:

1. In a transmission for an automotive vehicle, the combination of a drive shaft, a driven shaft, means for completing a plurality of gear trains between said shafts including a planetary gear set having a ring gear connected to said driven shaft and also having a planetary gear carrier, a clutch effective upon engagement to connect the planetary gear carrier with said drive shaft, a brake for another element of said planetary gear set for completing a reduced speed gear train between said shafts upon engagement of said clutch, and means for connecting said other element with still another element of said planetary gear set for completing a direct drive between said shafts upon engagement of said clutch.

2. In a transmission for an automotive vehicle, the combination of a drive shaft, a driven shaft, means for completing a plurality of gear trains between said shafts including a planetary gear set having a ring gear connected with said driven shaft and also having a planetary gear carrier and a pair of sun gears, a clutch effective upon engagement to connect the planetary gear carrier with said drive shaft, a brake for one of said sun gears for completing a reduced speed gear train between said shafts upon engagement of said clutch, and means for connecting said first sun gear to the other sun gear for completing a direct drive between said shafts upon engagement of said clutch.

3. In a transmission for an automotive vehicle, the combination of a drive shaft, a driven shaft, means for completing a plurality of gear trains between said shafts including a planetary gear set having a ring gear connected with said driven shaft and also having a planetary gear carrier and a pair of sun gears, a friction clutch effective upon engagement to connect the planetary gear carrier to said drive shaft, a friction brake for one of said sun gears for completing a reduced speed gear train between said shafts upon engagement of said friction clutch, and a pair of friction clutches for connecting said first sun gear with the other sun gear for completing a direct drive between said shafts upon engagement of said first-named clutch.

4. In a transmission for an automotive vehicle, the combination of a drive shaft, a driven shaft, a planetary gear set and a hydrodynamic coupling device between said shafts, a pair of clutches for selectively connecting a pair of elements of said planetary gear set with said hydrodynamic coupling device and a pair of brakes for selectively braking a pair of elements of said planetary gear set, said clutches and brakes being selectively operable to provide a pair of reduced speed power trains between said shafts and through said hydrodynamic coupling device and planetary gear set, and a third selectively operable clutch for connecting another element of said planetary gear set directly with said drive shaft and effective upon the selective operation of certain of said first-named clutches and brakes for completing a pair of relatively high speed power trains between said shafts and through said planetary gear set.

5. In a transmission for an automotive vehicle, the combination of a drive shaft, a driven shaft, a planetary gear set comprising a plurality of relatively rotatable elements and a hydrodynamic coupling device drivingly connected between said shafts, a pair of clutches for respectively connecting a pair of said elements of said planetary gear set with said hydrodynamic coupling device and a pair of brakes for selectively braking a pair of elements of said planetary gear set, said clutches and brakes being selectively operable to provide a plurality of reduced speed power trains between said shafts and through said hydrodynamic coupling device and planetary gear set, and a third selectively operable clutch for connecting another element of said planetary gear set with said drive shaft and effective upon engagement of one of said brakes for completing a relatively higher speed gear train and effective upon engagement of both of said first-named clutches for completing a second relatively higher speed gear train between said shafts and through said planetary gear set.

6. In a transmission for an automotive vehicle, the combination of a drive shaft, a driven shaft, means for completing first, second, third and direct drive forward speed power trains between said shafts and including a hydrodynamic coupling device and a planetary gear set comprising a plurality of relatively rotatable elements, a pair of clutches for respectively connecting a pair of said elements of said planetary gear set with said hydrodynamic coupling device, a pair of brakes for selectively braking a pair of said elements of said planetary gear set for completing said first and second forward speed power trains upon the selective operation of said clutches, said hydrodynamic coupling device and said planetary gear set both being effective to convert torque during the establishment of said first and second forward speed power trains, and a third clutch engageable for locking out said hydrodynamic coupling device and effective upon the engagement of one of said brakes for establishing said third forward speed power train, said planetary gear set alone converting torque during the establishment of said third forward speed power train, all of said clutches being effective upon the simultaneous engagement thereof for establishing said direct drive forward speed power train.

7. In a transmission for an automotive vehicle, the combination of a drive shaft, a driven shaft, means for completing first, second, third and direct drive forward speed power trains between said shaft and including a hydrodynamic coupling device, a planetary gear set having a plurality of relatively rotatable elements, a plurality of brakes and a plurality of clutches, said brakes and clutches being respectively effective to hold certain of said elements stationary and to connect certain of said elements to said hydrodynamic coupling device and functioning upon their selective operation to cause both said hydrodynamic coupling device and said planetary gear set to convert torque and thereby selectively establish said first and second forward speed power trains, one of said clutches being effective upon engagement to connect one of the elements of said planetary gear set directly to said drive shaft so that the planetary gear set alone converts torque and being further effective upon the simultaneous engagement of one of said brakes to establish said third forward speed power train, said one of said clutches being effective upon the engagement of the others of said clutches to establish said direct drive forward speed power train.

8. In a transmission for an automotive vehicle, the combination of a drive shaft, a driven shaft, a planetary gear set between said shafts, means for completing a low forward speed power train between said shafts through said planetary gear set and including a first brake and a first clutch, means for completing an intermediate forward speed power train between said shafts through said planetary gear set and including a second brake and a second clutch, means for completing a relatively higher intermediate forward speed power train between said shafts through said planetary gear set and including said first brake and a third clutch, means for completing a high forward speed power train between said shafts through said planetary gear set and including all of said clutches, and means for completing a reverse power train between said shafts through said planetary gear set and including said second brake and said first clutch.

9. In a transmission for an automotive vehicle, the combination of a drive shaft, a driven shaft, a hydraulic torque converter, a planetary gear set including a first sun gear, a second sun gear, and a planetary gear carrier, a first clutch for connecting said hydraulic torque converter with said first sun gear, a second clutch for connecting said hydraulic torque converter with said second sun gear, a first brake for holding said second sun gear against rotation, and a second brake for holding said planetary gear carrier against rotation, said first clutch and said first brake being effective upon engagement to establish a low forward speed power train between said shafts through said hydraulic torque converter and said planetary gear set, said second clutch and said second brake being effective upon engagement to establish a relatively higher forward speed power train between said shafts through said hydraulic torque converter and said planetary gear set, said first clutch and said second brake being effective upon engagement to establish a reverse power train between said shafts through said hydraulic torque converter and said planetary gear set.

10. In a transmission for an automotive vehicle, the combination of a drive shaft, a driven shaft, a hydraulic torque converter, a planetary gear set including a first sun gear, a second sun gear and a planetary gear carrier, a first clutch for connecting said hydraulic torque converter with said first sun gear, a second clutch for connecting said planetary gear carrier with said drive shaft, a first brake for holding said second sun gear against rotation, and a second brake for holding said planetary gear carrier against rotation, said first clutch and said first brake being effective upon engagement to establish a low forward speed power train between said shafts through said hydraulic torque converter and said planetary gear set, said second clutch and said first brake being effective upon engagement to establish a relatively higher forward speed power train between said shafts through said planetary gear set, said first clutch and said second brake being effective upon engagement to establish a reverse power train between said shafts through said hydraulic torque converter and said planetary gear set.

11. In a transmission for an automotive vehicle, the combination of a drive shaft, a driven shaft, a hydraulic torque converter, a planetary gear set including a first sun gear, a second sun gear and a planetary gear carrier, a first clutch for connecting said hydraulic torque converter with said first sun gear, a second clutch for connecting said second sun gear with said hydraulic torque converter, a third clutch for connecting said planetary gear carrier with said drive shaft, a first brake for holding said second sun gear against rotation, and a second brake for holding said planetary gear carrier against rotation, said second clutch and said second brake being effective upon engagement to establish a low forward speed power train between said shafts through said hydraulic torque converter and said planetary gear set, said third clutch and said first brake being effective upon engagement to establish a relatively higher forward speed power train between said shafts through said planetary gear set, said first clutch and said second brake being effective upon engagement to establish a reverse power train between said shafts through said hydraulic torque converter and said planetary gear set.

12. In a transmission for an automotive vehicle, the combination of a drive shaft, a driven shaft, a hydraulic torque converter, a planetary gear set including a first sun gear, a second sun gear and a planetary gear carrier, a first clutch for connecting said hydraulic torque converter with said first sun gear, a second clutch for connecting said hydraulic torque converter with a second sun gear, a third clutch for connecting said planetary gear carrier with said drive shaft, a first brake for holding said second sun gear against rotation, and a second brake for holding said planetary gear carrier against rotation, said first brake and said third clutch being effective upon engagement to establish a relatively low forward speed power train between said shafts through said planetary gear set, all of said clutches being effective upon engagement to establish a high forward speed power train between said shafts through said planetary gear set, said first clutch and said second brake being effective upon engagement to establish a reverse power train between said shafts through said hydraulic torque converter and said planetary gear set.

13. In a transmission for an automotive vehicle, the combination of a drive shaft, a driven shaft, a hydraulic torque converter, a planetary gear set including a first sun gear, a second sun gear and a planetary gear carrier, a first clutch for connecting said first sun gear to said hydraulic torque converter, a second clutch for connecting said second sun gear with said hydraulic torque converter, a third clutch for connecting said planetary gear carrier with said drive shaft, a first brake for holding said second sun gear against rotation, and a second brake for holding said planetary gear carrier against rotation, said first brake and first clutch being effective upon engagement to establish a low forward speed power train between said shafts through said hydraulic torque converter and said planetary gear set, said second clutch and said second brake being effective upon engagement to establish an intermediate forward speed power train between said shafts through said hydraulic torque converter and planetary gear set, said third clutch and said first brake being effective upon engagement to establish a relatively high forward speed power train between said shafts through said planetary gear set.

14. In a transmission for an automotive vehicle, the combination of a drive shaft, a driven shaft, a hydraulic torque converter, a planetary gear set including a first sun gear, a second sun gear and a planetary gear carrier, a first clutch for connecting said hydraulic torque converter with said first sun gear, a second clutch for connecting said hydraulic torque converter with said second sun gear, a third clutch for connecting said planetary gear carrier with said drive shaft, a first brake for holding said second sun gear against rotation, and a second brake for holding said planetary gear carrier against rotation, said first clutch and said first brake being effective upon engagement to establish a low forward speed power train between said shafts through said hydraulic torque converter and said planetary gear set, said second clutch and said second brake being effective upon engagement to establish an intermediate forward speed power train between said shafts through said hydraulic torque converter and said planetary gear set, all of said clutches being effective upon engagement to establish a direct forward drive between said shafts.

15. In a transmission for an automotive vehicle, the combination of a drive shaft, a driven shaft, a hydraulic torque converter, a planetary gear set including a first sun gear, a second sun gear and planetary gear carrier, a first clutch for connecting said hydraulic torque converter with said first sun gear, a second clutch for connecting said hydraulic torque converter with said second sun gear, a third clutch for connecting said planetary gear carrier with said drive shaft, a first brake for holding said second sun gear against rotation, and a second brake for holding said planetary gear carrier against rotation, said first brake and said first clutch being effective upon engagement to establish a low forward speed power train between said shafts through said hydraulic torque converter and said planetary gear set, said second brake and said second clutch being effective upon engagement to establish an intermediate forward speed power train between said shafts through said hydraulic torque converter and said planetary gear set, said first brake and said third clutch being effective upon engagement to establish a relatively higher intermediate forward speed power train between said shafts through said planetary gear set, all of said clutches being effective upon engagement to establish a direct forward drive between said shafts.

16. In a transmission for an automotive vehicle, the combination of a drive shaft, a driven shaft, a hydraulic torque converter, a planetary gear set including a first sun gear, a second sun gear and a planetary gear carrier, a first clutch for connecting said hydraulic torque converter with said first sun gear, a second clutch for connecting said hydraulic torque converter with said second sun gear, a third clutch for connecting said planetary gear carrier with said drive shaft, a first brake for holding said second sun gear against rotation, and a second brake for holding said planetary gear carrier against rotation, said first brake and said first clutch being effective upon engagement to establish a low forward speed power train between said shafts through said hydraulic torque converter and said planetary gear set, said second clutch and said second brake being effective upon engagement to establish an intermediate forward speed power train between said shafts through said hydraulic torque converter and said planetary gear set, said third clutch and said first brake being effective upon engagement to establish a relatively higher intermediate forward speed power train between said shafts through said planetary gear set, said second and third clutches being effective upon engagement to establish a split high forward speed power train between said shafts through said hydraulic torque converter and said planetary gear set.

17. In a transmission for an automotive vehicle, the combination of a drive shaft, a driven shaft, a hydraulic torque converter, a planetary gear set including a first sun gear, a second sun gear and a planetary gear carrier, a first clutch for connecting said hydraulic torque converter with said first sun gear, a second clutch for connecting said hydraulic torque converter with said second sun gear, a third clutch for connecting said planetary gear carrier with said drive shaft, a first brake for holding said second sun gear against rotation, and a second brake for holding said planetary gear carrier against rotation, said first brake and said first clutch being effective upon engagement to establish a low forward speed power train between said shafts through said hydraulic torque converter and said planetary gear set, said second brake and said second clutch being effective upon engagement to establish an intermediate forward speed power train between said shafts through said hydraulic torque converter and said planetary gear set, said first brake and said third clutch being effective upon engagement to establish a relatively higher intermediate forward speed power train between said shafts through said planetary gear set, all of said clutches being effective upon engagement to establish a high forward speed power train between said shafts, said second brake and said first clutch being effective upon engagement to establish a reverse power train between said shafts through said hydraulic torque converter and said planetary gear set.

18. In a transmission for an automotive vehicle, the combination of a drive shaft, a driven shaft, a planetary gear set connected between said shafts and including a planetary gear carrier and two sun gears, means for connecting said planetary gear carrier to said drive shaft and connecting said two sun gears together for providing a one-to-one power train between said shafts, and means for connecting one of said sun gears and said planetary gear carrier to said drive shaft for providing a different substantially one-to-one power train between said shafts.

19. In a transmission for an automotive vehicle, the combination of a drive shaft, a driven shaft, a planetary gear set connected between said shafts and including a planetary gear carrier and two sun gears, clutch means for clutching said planetary gear carrier to said drive shaft and for clutching said sun gears together to provide a power train having a predetermined ratio between said shafts, and clutch means for clutching one of said sun gears and said planetary gear carrier to said drive shaft to provide a second power train having substantially the same ratio between said shafts.

20. In a transmission for an automotive vehicle, the combination of a drive shaft, a driven shaft, a planetary gear set connected between said shafts and including a planetary gear carrier and two gears, means for completing a first one-to-one drive between said shafts and including a first clutch for interconnecting said drive shaft and said planetary gear carrier and a pair of clutches for interconnecting said two gears, and means for completing an alternative substantially one-to-one drive between said shafts and including said first clutch for interconnecting said drive shaft and said planetary gear carrier and one other of said clutches for connecting one of said gears to said drive shaft.

21. In a transmission for an automotive vehicle, the combination of a drive shaft, a driven shaft, a planetary gear set, a hydrodynamic device, means for providing a direct one-to-one drive between said shafts and comprising a pair of clutches for locking a pair of elements of said planetary gear set together to thereby lock up the planetary gear set and a third clutch for directly connecting a third element of said planetary gear set to said driven shaft, and one of said first two clutches and said third clutch being engageable for providing a split substantially one-to-one drive between said shafts which drive proceeds through said hydrodynamic device and through said planetary gear set.

22. In a transmission for an automotive vehicle, the combination of a drive shaft, a driven shaft, a planetary gear set having a plurality of elements connected between said shafts, a hydrodynamic coupling device connected between said shafts, means for connecting one of said elements to said drive shaft and for interconnecting two others of said elements together for providing a direct one-to-one power train between said shafts that bypasses said hydrodynamic coupling device, and means for connecting one of said elements to said drive shaft and another of said elements to said hydrodynamic coupling device to provide a split substantially one-to-one power train between said shafts that goes through both said hydrodynamic coupling device and said planetary gear set.

23. In a transmission for an automotive vehicle, the combination of a drive shaft, a driven shaft, a hydrodynamic coupling device, a planetary gear set including a planetary gear carrier and two sun gears, and drive connecting means comprising means for clutching said planetary gear carrier to said drive shaft and for clutching said two sun gears together to provide a direct one-to-one power train between said shafts that bypasses said hydrodynamic coupling device, and means for clutching one of said sun gears to said hydrodynamic coupling device and for clutching said planetary gear carrier to said drive shaft to provide a split substantially one-to-one power train between said shafts which drive proceeds through said coupling device and said gear set.

24. In transmission mechanism, the combination of a drive shaft, a driven shaft, a planetary gear set between said shafts and comprising a ring gear connected with said driven shaft, a pair of relatively small and large sun gears, a planetary gear carrier, a plurality of relatively large planetary pinions carried by said carrier and respectively meshing with said small sun gear and with said ring gear and a plurality of relatively small planetary pinions each meshing with said large sun gear and respectively meshing with said large planetary pinions, three clutches for selectively connecting said sun gears and said carrier to said drive shaft, and a pair of brakes for selectively braking said large sun gear and said carrier, a first one of said clutches and a first one of said brakes being engageable to establish a low forward speed power train between said shafts, a second one of said clutches and the second one of said brakes being engageable to establish an intermediate forward speed power train between said shafts, the third one of said clutches and said first one of said brakes being engageable to establish a high forward speed power train between said shafts, and all three of said clutches being simultaneously engageable for establishing a direct one-to-one drive between said shafts.

References Cited in the file of this patent

UNITED STATES PATENTS

| | | |
|---|---|---|
| 2,088,782 | Ford, et al. | Aug. 3, 1937 |
| 2,102,634 | Lysholm | Dec. 21, 1937 |
| 2,132,728 | Ford, et al. | Oct. 11, 1938 |
| 2,146,369 | Dodge | Feb. 7, 1939 |
| 2,220,174 | Ravigneaux | Nov. 5, 1940 |
| 2,302,714 | Pollard | Nov. 24, 1942 |
| 2,368,801 | Carnagua | Feb. 6, 1945 |
| 2,372,817 | Dodge | Apr. 3, 1945 |
| 2,456,328 | Schneider | Dec. 14, 1948 |
| 2,466,206 | Carnagua | Apr. 5, 1949 |
| 2,547,236 | Swenson | Apr. 3, 1951 |
| 2,549,125 | Paton | Apr. 17, 1951 |
| 2,551,746 | Iavelli | May 8, 1951 |
| 2,609,706 | Jandasek | Sept. 9, 1952 |
| 2,616,311 | Lapsley | Nov. 4, 1952 |
| 2,651,949 | Barnes | Sept. 15, 1953 |
| 2,671,359 | Scheiter | Mar. 9, 1954 |

FOREIGN PATENTS

| | | |
|---|---|---|
| 154,694 | Great Britain | Nov. 30, 1920 |
| 632,292 | Great Britain | Dec. 30, 1945 |
| 929,571 | France | Dec. 31, 1947 |